(12) United States Patent
Prinzing (10) Patent No.: US 6,470,364 B1
(45) Date of Patent: Oct. 22, 2002

(54) METHOD AND APPARATUS FOR GENERATING TEXT COMPONENTS

(75) Inventor: Timothy N. Prinzing, Capitol, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/255,654

(22) Filed: Feb. 23, 1999

Related U.S. Application Data
(60) Provisional application No. 60/075,975, filed on Feb. 24, 1998.

(51) Int. Cl.$^7$ ............................................. G06F 17/21
(52) U.S. Cl. ....................................... 707/530; 707/531
(58) Field of Search ......................... 707/50, 529, 530, 707/531, 516, 515; 345/762, 763, 825, 810, 811, 812, 813

(56) References Cited

U.S. PATENT DOCUMENTS

| | | | | |
|---|---|---|---|---|
| 5,276,793 A | * | 1/1994 | Borgendale et al. | 395/148 |
| 5,398,312 A | * | 3/1995 | Hoffmann | 395/156 |
| 5,459,827 A | | 10/1995 | Allouche et al. | 395/148 |
| 5,479,596 A | | 12/1995 | Capps et al. | 395/148 |
| 5,530,796 A | * | 6/1996 | Wang | 395/156 |
| 5,765,177 A | | 6/1998 | Nakatsuyama et al. | 707/514 |
| 5,787,449 A | | 7/1998 | Vulpe et al. | 707/513 |
| 5,860,073 A | | 1/1999 | Ferrel et al. | 707/522 |
| 5,862,395 A | * | 1/1999 | Bier | 395/800.01 |
| 6,006,242 A | | 12/1999 | Poole et al. | 707/531 |
| 6,016,492 A | | 1/2000 | Saxton et al. | 707/100 |
| 6,185,591 B1 | * | 2/2001 | Baker et al. | 707/531 |
| 6,247,032 B1 | * | 6/2001 | Bernado et al. | 707/530 |
| 6,253,217 B1 | | 6/2001 | Dourish et al. | 707/500 |
| 6,308,179 B1 | | 10/2001 | Petersen et al. | 707/102 |
| 6,324,551 B1 | | 11/2001 | Lamping et al. | 707/500 |

* cited by examiner

*Primary Examiner*—Stephen S. Hong
(74) *Attorney, Agent, or Firm*—Finnegan, Henderson, Farabow, Garrett & Dunner, L.L.P.

(57) ABSTRACT

A graphical user interface (GUI) application executed on a computer system is provided that generates a text component in a graphical user interface (GUI). Initially, a user interface style is selected for the text component displayed on a GUI. This can be automatically selected by the GUT application or a user. The GUI application then delegates implementation of the user interface style within the text component to a text user interface object and delegates implementation of a text editor within the text component to an editor kit object. The editor kit object generates the text editor for the text component customized according to the type of text being edited. The text user interface object then displays the text component and the text editor with the selected user interface style.

14 Claims, 7 Drawing Sheets

METHOD AND APPARATUS FOR GENERATING TEXT COMPONENTS

RELATED APPLICATIONS

The following identified U.S. patent applications are relied upon and are incorporated by reference in their entirety in this application.

Provisional U.S. patent application Ser. No. 60/075,975, entitled METHOD AND APPARATUS FOR USER INTERFACE WITH PLUGGABLE LOOK AND FEEL," filed on Feb. 24, 1998.

U.S. patent application Ser. No. 09/255,643, entitled "MODULAR STORAGE METHOD AND APPARATUS FOR USE WITH SOFTWARE APPLICATIONS,"

U.S. patent application Ser. No. 09/255,657, entitled "METHOD AND APPARATUS FOR AN EXTENSIBLE EDITOR,"

U.S. patent application Ser. No. 08/885,614/P2390 filed Jun. 30, 1997, assigned to the assignee of the present invention and entitled, "METHOD AND APPARATUS FOR GENERATING A GRAPHICAL USER INTERFACE", by Timothy N. Prinzing.

BACKGROUND OF THE INVENTION

1. Field of the Invention

This invention generally relates to graphical user interfaces and more particularly, a method and apparatus for generating text components used in an editor.

2. Description of the Related Art

A wide variety of computer-based systems run applications having a graphical user interface (GUI). The GUI generates components on a display screen such as buttons, sliders, and selection boxes that a user selects with a pointing device such as a mouse. Many applications use a GUI because it is easier to use than a command-based interface.

Figure 1:
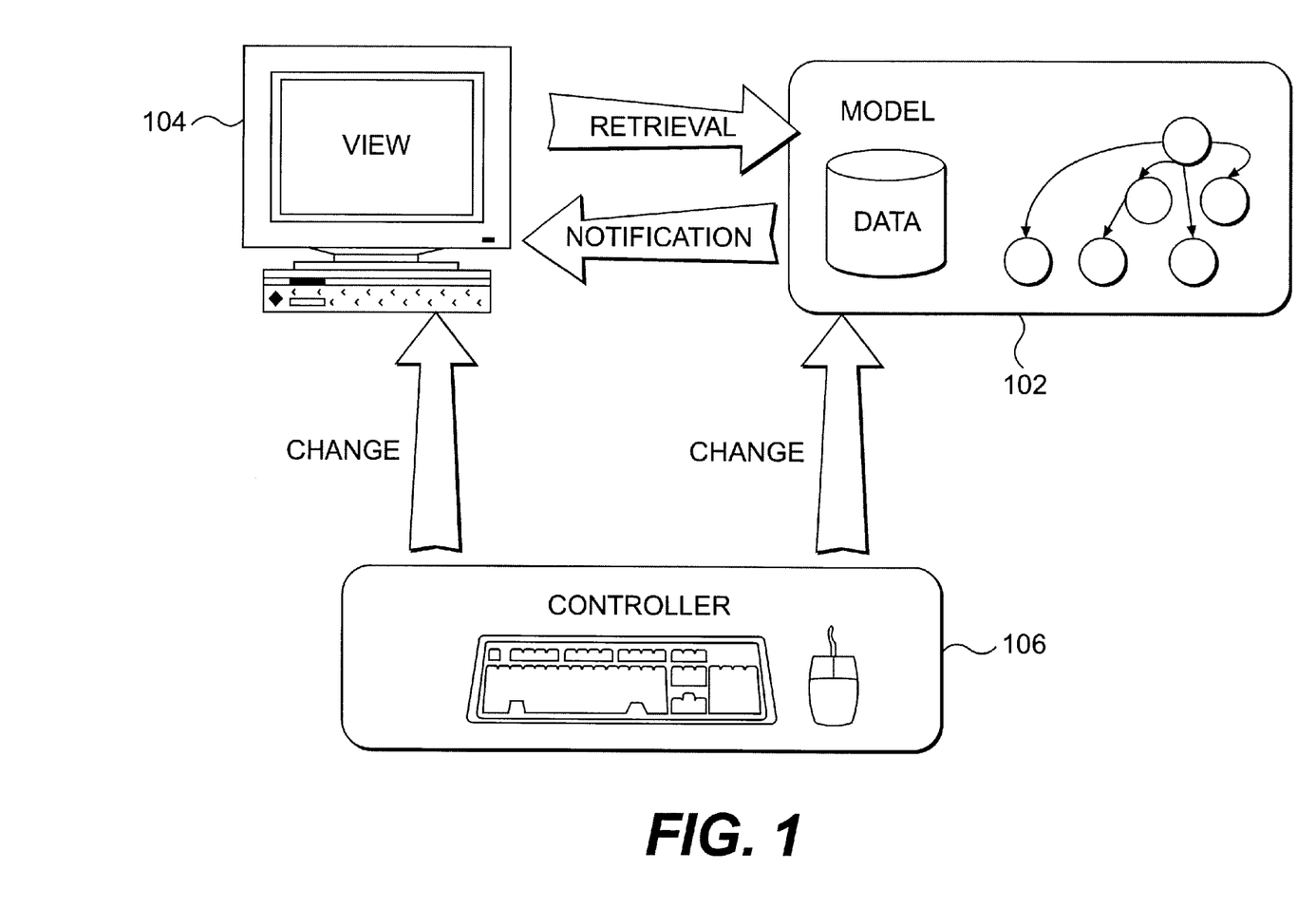
FIG. 1 is a block diagram of the model, view, and controller, design paradigm used to develop GUI applications.

To make GUI based applications more portable, software developers have attempted to develop GUI based applications in logical modules. Each logical module can be replaced or modified without affecting the operation of other related modules. The Smalltalk-80 object oriented programming language made a first step to improve GUI based application development by introducing the model, view, and controller (MVC) set of classes as illustrated in FIG. 1.

A model 102 represents the data and processes that use the data in an application. The data, typically stored as a stream of data in a file, may include metadata that describes the organization of information. This organization provides a logical structure of data elements that an application can manipulate. Each data element may include a data portion and corresponding attributes used to format the data portion. For example, a Hypertext Markup Language Document (HTML) has metadata called "tags" which provides a logical and structural relationship between text elements in a document. The following example of HTML uses tags to create a logical structure within the document.

```
<HTML>
...
<INPUT TYPE=text NAME=inputfield1 VALUE="">
```

The angle brackets (i.e. "<", ">") are used in HTML to indicate a tag. The structural and logical relationship between data elements can be defined using these HTML tags. Tags can also be used to describe more information about the data elements. For example, the HTML tag above indicates that the document is an HTML type document. The INPUT tag indicates that the text between the brackets defines a data element used for inputting values. Other attributes associated with the INPUT element such as TYPE, NAME, and VALUE further describe specific characteristics of the input element. For example, TYPE=text indicates that input element is of type text.

A view 104 in the MVC paradigm is the visual representation of the data in a GUI. The view generally includes GUI components such as buttons, sliders, check boxes, and pop-up menus displayed on a display screen. These views are generated using the style of a particular user interface. For example, a view may provide GUI components on a screen using a user interface style such as Windows, OpenLook, or Macintosh. Such interface styles may include the controls used to open, close, minimize, or maximize a window surrounding a particular GUI component. They also may describe buttons and other components as having two or three-dimensions buttons when displayed on a display screen.

Views and models communicate through a subscribe and notify protocol. The view subscribes to the model that may cause a particular view to change. When data associated with the model does change, the model notifies the views that depend on the model's data. This notification allows the views to update the visual representation of data on the screen. For example, if the values in a spreadsheet are modified the model associated with these values notifies the corresponding view that a new set of values must be displayed.

A controller 106 object in the MVC paradigm determines the way a view responds to user input. Essentially, view 104 uses an instance of controller 106 to implement a particular interaction between view 104 and a user. For example, controller 106 may determine how view 104 responds to a keyboard or if view 104 uses pop-up menus. To change the interaction, one need only change controller 106 and not view 104. Using this design, the model, view, and controller portions of a GUI application can be changed and updated as modules.

In general, dividing applications into model, view, and control modules improved software development costs because portions of the applications could be reused. For example, the view portion of an application could be modified or replaced without affecting the model or control portions of the application. Unfortunately, specific applications such as text editors need more flexibility than the conventional MVC classes are capable of providing. Specifically, generating text editors with a variety of user interface styles is not greatly improved using conventional MVC classes.

Within a text editor application, there is a text component that processes the text and other components that operate the text editor such as buttons and pull-down menus. This text component may be used to format the text in the application and produce a visual representation of the text such as on a display device. Different types of text components can be developed to edit different types of text. For example, a text component for HTML can be developed that highlights keywords in HTML, performs basic HTML syntax checking, and allows a user to cut, paste, and insert HTML-based text.

Each text component also has a user interface style. The user interface style determines the shape and appearance of the window surrounding the text editor and the location of controls used to interact with the text component. For example, one user interface style may represent windows and buttons in three-dimensions on the display screen while another user interface style may only present windows on the display screen having two-dimensions.

Conventional MVC classes, however, do not provide a method of customizing the text component for different types of text and different types of user interfaces. Using conventional MVC classes, a separate text component must be generated for each type of text and each user. interface type. This occurs because conventional MVC classes couple a specific user interface style to each text component. Thus, to generate a text component with a new user interface, the software developer must create new text components in the new user interface style for each type of text supported by the text components. This increases development costs and storage space for holding each of the different text components. For example, there must be 9 different text components created to edit 3 different types of text such as HTML, C code, and Java code and 3 user interface styles such as the Windows user interface style, the MacIntosh user interface style, and the Motif user interface style. Each time a new text type or a new user interface style is added many more text components must be created.

To address these limitations, it is desirable to improve the method of customizing text components that edit a particular type of text and have a particular type of user interface style.

SUMMARY OF THE INVENTION

In accordance with methods and systems consistent with the present invention, an improved editor used on a computer system is provided that generates a text component corresponding to a selectable user interface style and the type of content associated with the text component. This improved design decouples the selection of the user interface style from the type of text a text component can edit. This allows a text component used to edit a particular type of text to be customized to many different user interface styles. Similarly, a text component designed for a particular user interface style can be customized to edit a number of different types of text. This saves on development costs because a single text component can be customized to edit numerous types of text and appear with different user interface styles. This also saves on storage because fewer text components must be stored in memory or secondary storage such as disk.

To generate the text component, the editor delegates determination of characteristics corresponding to the selected user interface style to a first component. The first component selects the user interface details for the text component but does not implement details associated with processing the particular type of content. Instead, the editor delegates determination of the content based characteristics to a second component. Content may be text used in editors, alphanumeric characters used in a spreadsheets, or other types of characters used in other applications. The text component is created by combining the content based characteristics with the user interface style characteristics. This customized text component is then used by the editor to edit the text using the selected user interface style.

BRIEF DESCRIPTION OF THE DRAWINGS

The accompanying drawings, which are incorporated in and constitute a part of this specification, illustrate an implementation of the invention and, together with the description, serve to explain the advantages and principles of the invention.

In the drawings.

DETAILED DESCRIPTION

In accordance with methods and systems consistent with the present invention, an improved editor used on a computer system is provided that generates a text component corresponding to a selectable user interface style and the type of content associated with the text component. This improved design decouples the selection of the user interface style from the type of text a text component can edit. This allows a text component used to edit a particular type of text to be customized to many different user interface styles. Similarly, a text component designed for a particular user interface style can be customized to edit a number of different types of text. This saves on development costs because a single text component can be customized to edit numerous types of text and appear with different user interface styles. This also saves on storage because fewer text components must be stored in memory or secondary storage such as disk.

Overview

Figure 2:
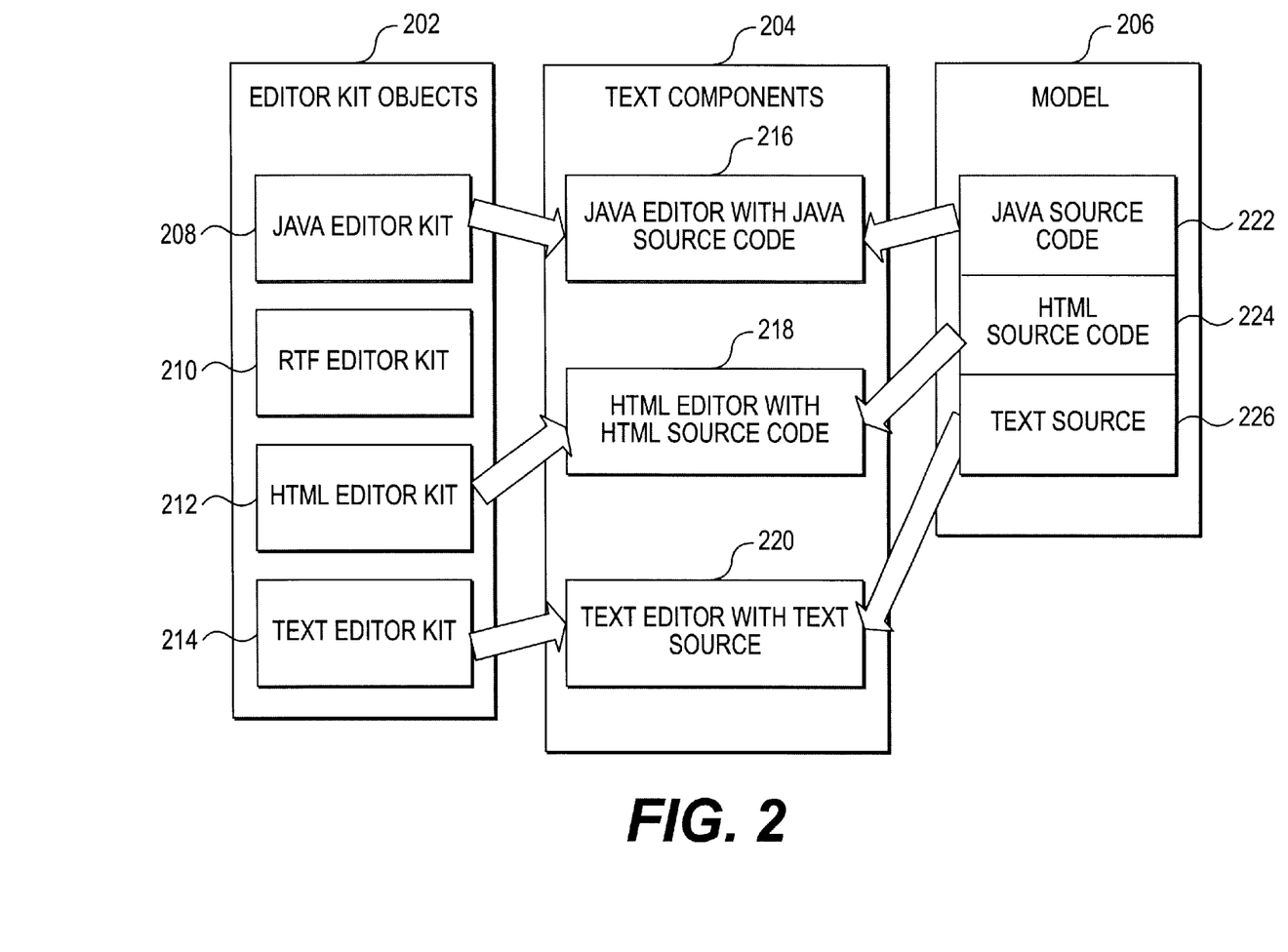
FIG. 2 is a block diagram illustrating the plugging of a text editor into an GUI application based on the type of text being edited.

Implementations consistent with the present invention facilitate generating text components in a GUI application based on text type. FIG. 2 is a block diagram illustrating the use of customized text editors in such a GUI application. This example includes editor kit objects 202, a text user interface object 203, a text component 204 being displayed on a display screen, and a model 206 with the text information used by a GUI application. Editor kit objects 202 include a Java editor kit 208, a rich text format (RTF) editor kit 210, a hypertext markup language (HTML) editor kit 212, and a text editor kit 214. The editor kits used to customized editors for editing Java source code, RTF text, HTML source code, and text source respectively. Text user interface object 203 implements user interface styles for different text components using interface styles such as the Windows user interface style, the MacIntosh user interface style, and the Motif user interface style.

In this example, model 206 includes different types of text used in the GUI application including Java source code 222, HTML source code 224, and text source 226. Upon execution, the GUI application delegates generating a customized editor for the text component to the appropriate editor kit object selected from editor kit objects 202. The GUI application delegates generating the user interface style for each text component to text user interface object 203. By delegating these tasks to different objects, the GUI application can generate text components having customized text editors and user interface styles. Specifically, Java editor kit 208 processes Java source code 222 and is used as a Java editor with Java source code 216. Similarly, HTML editor kit 212 processes HTML source code 224 and text editor kit 214 processes text source 226 to be used as HTML editor with HTML source code 218 and Text Editor with Text Source 220 respectively. In each of these cases, text user interface object 203 provides the text component with the proper user interface style such as the Windows user interface style, the Macintosh user interface style, and the Motif user interface style.

Computer System with Graphical User Interface

Figure 3:
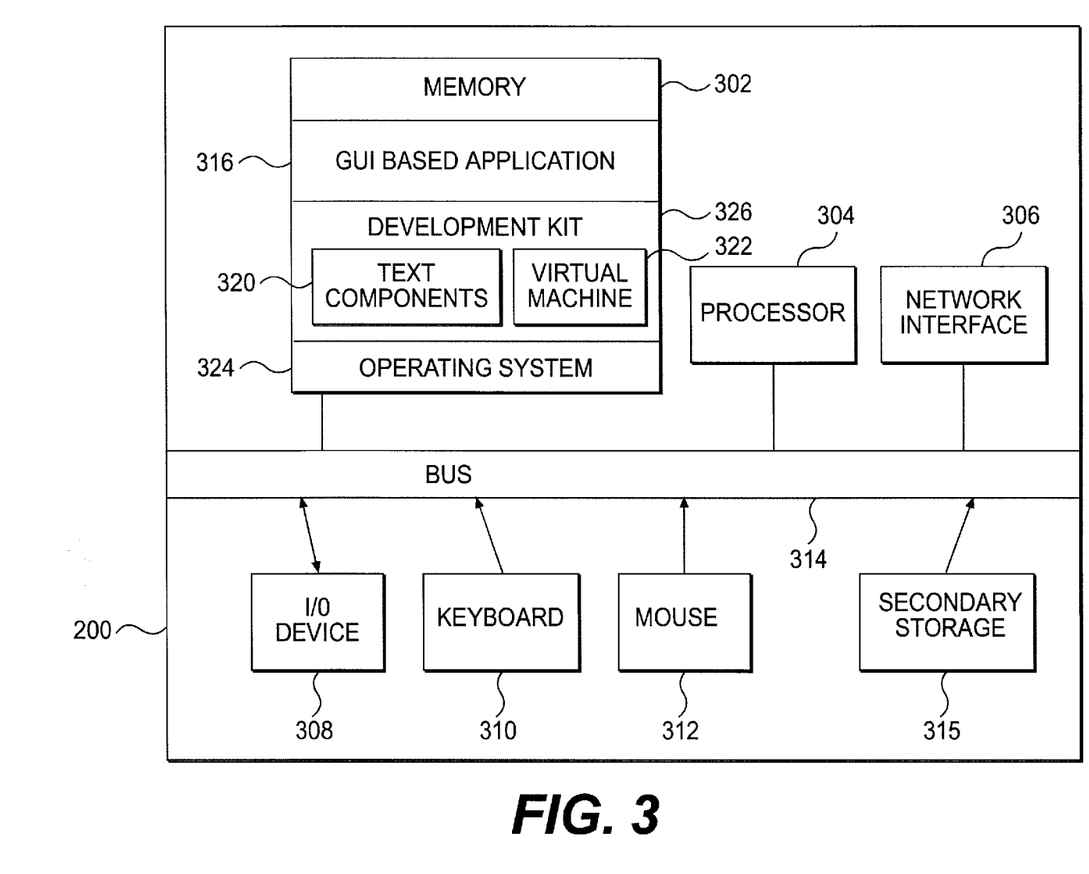
FIG. 3 is block diagram of a computer system suitable for use with methods and systems consistent with the present invention.

FIG. 3 is block diagram of a computer system suitable for use with methods and systems consistent with the present invention. Computer system 300 includes a memory 302, a processor 304, a network interface 306, an input-output device 308, a keyboard 310, a mouse 312, a secondary storage 315, and a bus 314 which provides connectivity and communication among these subsystems. Network interface 306 can be connected to a Local Area Network (LAN), a Wide Area Network (WAN), or the Internet. Bus 314 may use a standard bus protocol.

Memory 302 includes a GUI application 316, a development kit (DK) 326, and an operating system 324. GUI application 316 may be a business software application, a software development tool, or other software application with a GUI. DK 326 provides a variety of libraries, subroutines, classes, drivers, and other software modules accessible to GUI application 316 using application programming interfaces (API).

For example, DK 326 may include virtual machine 322 and classes used in an object oriented programming language such as the Java™ programming language. Virtual machine 322 facilitates platform independent data processing by simulating the operation of an abstract computing machine. Virtual machine 322 receives instructions for this abstract computing machine in the form of bytecodes. These bytecodes are interpreted and dynamically converted into a form for execution, such as object code, on processor 304. Essentially, bytecodes can be executed on any hardware platform having virtual machine 322. Java and the Java Virtual Machine and other derivatives of Java are trademarks of Sun Microsystems, Inc. and are provided as part of Sun Microsystems Java Development Kit (JDK).

Text components 320 designed consistent with implementations of the present invention are also included in DK 326. These text components include customized editors to manage text for a number of different user interface styles and text types. Unlike conventional text components, the text editors used by text component 320 may vary depending on both the type of text and the user interface style selected.

Figure 4:
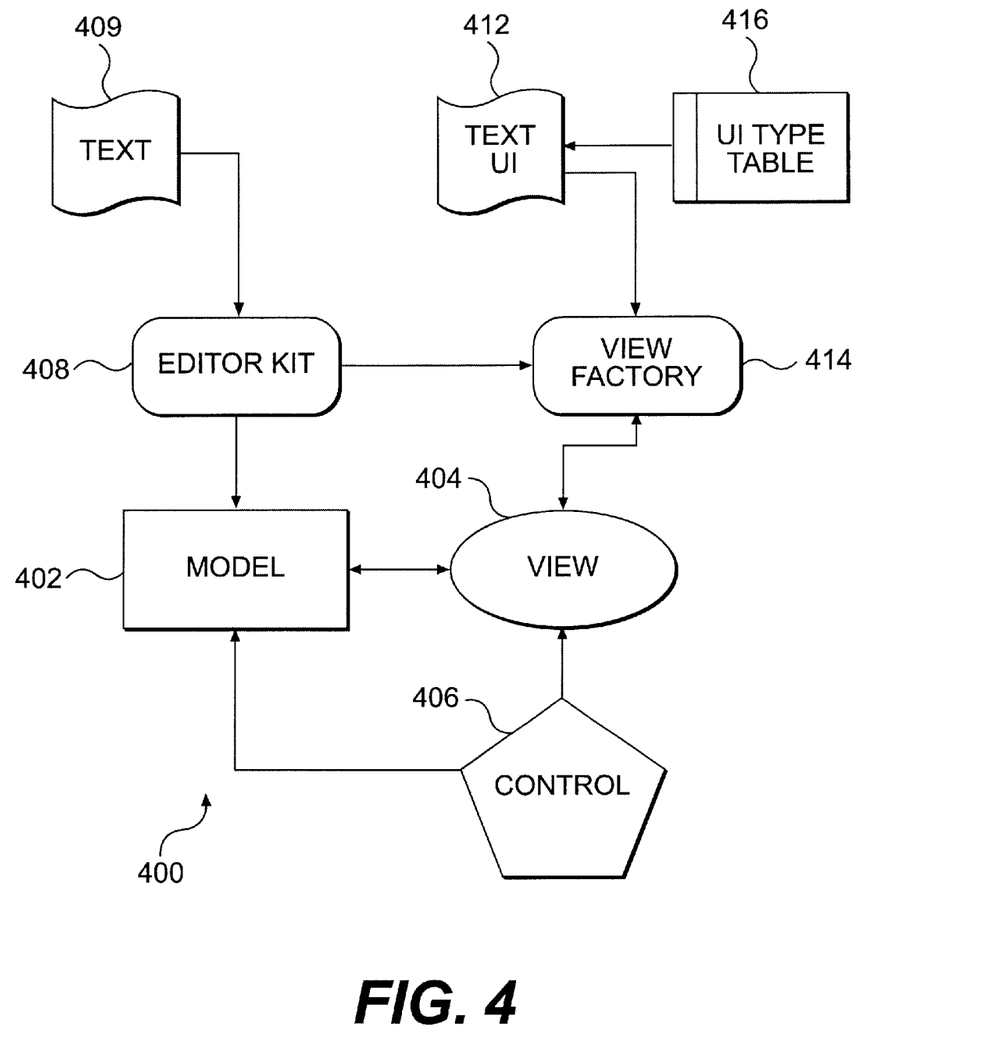
FIG. 4 is a block diagram illustrating improved model, view, and control (MVC) classes for implementing pluggable text components in a GUI application.

FIG. 4 is a block diagram illustrating the improved model, view, and control (MVC) classes for implementing pluggable text components in a GUI application 400. These classes are the basic building blocks for a GUI application designed in accordance with methods and systems consistent with the present invention. Model 402 includes the application and text with metadata information used by the application. View 404 displays GUI text components and other types of GUI components on a display device. Control 406 controls how a user interacts with model 402 and view 404 in GUI application 400.

GUI application 400 delegates generating views based on a user interface and type of text to a view factory 414 and an editor kit 408 respectively. Both the user interface and the features for editing text are pluggable because they can be replaced dynamically without reprogramming other portions of the GUI application. View factory 414 is an object that facilitates pluggable components by defining an interface to create view objects but letting subclasses decide which classes to instantiate for the views. In this example, view factory 414 delegates user interface portions of the view to a Text User Interface (UI) object 412 and customization of the text editor to Editor Kit 408. For more information on factories see "Design Patterns: Elements of Reusable Object-Oriented Software," Erich Gamma, Richard Helm, Ralph Johnson, and John Vlissides, Addison-Wesley Professional Computing Series, 1995, incorporated herein by reference.

View Factory 414 receives information on creating user interface views from Text UI 412 and UI type Table 416. UI Type Table 416 can be selected by the application or the user and may include user interface styles such as the Windows user interface style, the MacIntosh user interface style, and the Motif user interface style. For example, a user can make View Factory 414 generate GUI components having a Windows user interface by selecting the Windows interface style in UI Type Table 416.

Text UI 412 contains implementation details on the presentation and event-handling of a particular UI component given the UI type in UI Type Table 416. To generate a view for a GUI component, view factory 414 uses information provided by Text UI 412 and UI Type Table 416. For example, Text UI 412 and UI Type Table 416 may be used to provide information on generating the views for GUI components such as a slider or button. If the GUI component does not include an area for editing text, View Factory 414 can generate view 404 without additional information from Editor Kit 408. U.S. patent application Ser. No. 60/075,975 assigned to the assignee of the present invention entitled, "METHOD AND APPARATUS FOR GENERATING A GRAPHICAL USER INTERFACE", by Timothy N. Prinzing discusses generating views and pluggable user interface components in a GUI application.

To generate a GUI component having a text editor, View Factory 414 delegates text editor customizations to Editor Kit 408. These GUI components are called text components because they include an area for editing text in addition to the other features of a GUI component. Editor Kit 408 provides custom text editing features to text editor in the text component based on the type of text in text 409. For example, these text types may include HTML, RTF, plain text, or programming languages such as C or Java. Functions for editing the particular type of text are provided to model 402 and views for displaying the editor are provided to View Factory 414. In turn, View Factory combines the views for the particular customized editor with the particular user interface information in Text UI 412 to generate views for view 404.

Using this method, the text editor is customized for a particular text type and to a particular user interface style. Unlike a conventional GUI application, the user interface style does not dictate the appearance of text, the interaction when a text component is selected, the key mappings used to manipulate the text (e.g. short cut keystrokes used to perform actions on text such as cut, copy, and paste), and other text processing features. Instead, these functions are determined by a customized editor in the pluggable text component.

Pluggable Text Components

Figure 5:
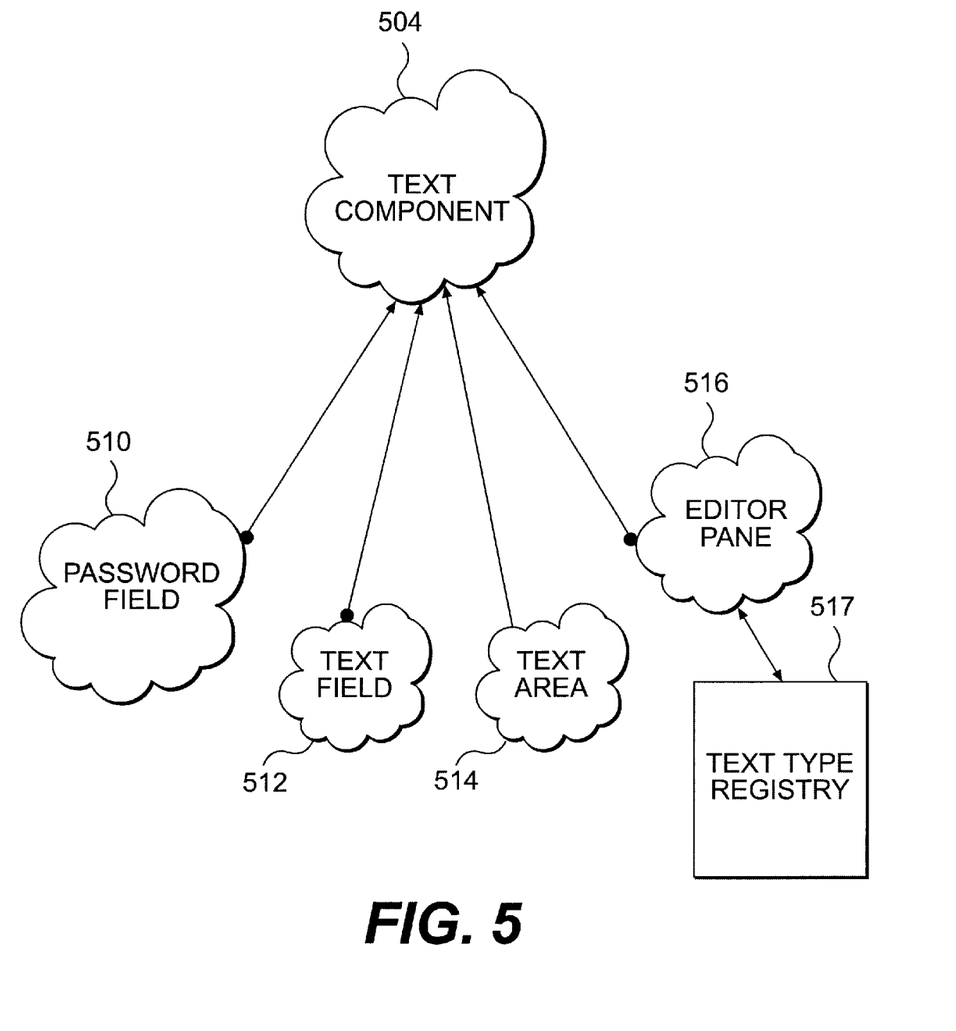
FIG. 5 is an object diagram consistent with one implementation of the present invention.

Pluggable text components consistent with the present invention can be implemented using an object oriented programming language. FIG. 5 is a diagram of objects used to generate a text component 504 consistent with the present invention. This diagram illustrates the relationships between objects used in an object oriented programming language such as Java.

Referring to FIG. 5, objects include a Text Component 504, a Password Field 510, a Text Field 512, a Text Area 514, and an Editor Pane 516. Text component 504 is an abstract class compatible with pluggable GUI components and non-pluggable GUI components. Classes which define but do not implement methods in a class are called abstract classes. Objects instantiated from abstract classes must implement the defined methods before they can be used. In this example, Password Field 510, Text Field 512, Text Area 514, and Editor Pane 516 implement methods defined by Text Component 504.

Non-pluggable text components include classes for features often found in legacy object environments. These text components include Password Field 510, Text Field 512, and Text Area 514. Unlike pluggable text components, the management of text in these components is predetermined and can not be altered. For example, Password Field 510 provides a text field which overstrikes characters as a user enters character information to ensure privacy from onlookers. Text Field 512 provides a one row high by N character long place for text input while Text Area 514 provides an N by N character area for entering several rows of text.

Editor Pane 516 is a pluggable component and a subclass of Text Component 504. Editor Pane 516 is also an abstract class that delegates the implementation details associated with the user interface and text based portion of Text Component 504 to two different additional subclasses: a Text UI class and an Editor Kit class. Both of these classes are discussed in further detail below. This arrangement decouples the determination of user interface characteristics from operation of a text based editor. Thus, an application can select a user interface style independent of the text editor used to edit the text.

Editor Pane 516 uses a Text Type Registry 517 to track the different types of text used in a GUI application. By default, Editor Pane 516 may load text type registry 517 with a set of often used text types such as plain text, HTML, and RTF text. For each entry in Text Type Registry, Editor Pane 516 also loads a corresponding editor kit to provide customized editing functions and views suited for the particular type of text. Entries in Text Type Registry 517 can also be extended dynamically to support additional text types not available in Text Type Registry 517. For example, an application with a new type of text may also include an editor kit object capable of generating a customized editor functions and views for the new type of text. When the application is executed, this new editor kit is loaded or plugged into editor pane 516.

Table 1 includes exemplary methods associated with Editor Pane 516 developed in the Java programming language and consistent with one implementation of the present invention.

TABLE 1

| Editor Pane Methods | Description of Method |
| --- | --- |
| EditorPane.AccessibleEditorPane | The class used to obtain the accessible role for this object. |
| EditorPane( ) | Constructs a new EditorPane. |
| EditorPane(java.net.URL initialPage) | Creates a EditorPane based on a specified URL for input. |
| EditorPane(java.lang.String url) | Creates a EditorPane based on a string containing a URL specification. |
| void addHyperlinkListener(HyperlinkListener listener) | Adds a hyperlink listener for notification of any changes, for example when a link is selected and entered. |
| EditorKit createDefaultEditorKit( ) | Creates the default editor kit (PlainEditorKit) for when the component is first created. |
| Static EditorKit createEditorKitForContentType(java.lang.String type) | Create a handler for the given type from the default registry of editor kits. |
| void fireHyperlinkUpdate(HyperlinkEvent e) | Notifies all listeners that have registered interest for notification on this event type. |
| AccessibleContext getAccessibleContext( ) | Get the AccessibleContext associated with this EditorPane. |
| java.lang.String getContentType( ) | Gets the type of content that this editor handles. |
| EditorKit getEditorKit( ) | Fetches the currently installed kit for handling content. |
| EditorKit getEditorKitForContentType(java.lang.String type) | Fetches the editor kit to use for the given type of content. |
| java.net.URL getPage( ) | Gets the current url being displayed. |
| boolean getScrollableTracksViewportWidth( ) | Returns true if a viewport should always force the width of this Scrollable to match the width of the viewport. |
| java.lang.String getUIClassID( ) | Gets the class ID for the UI. |
| boolean isManagingFocus( ) | Turns off tab traversal once focus gained. |
| static void registerEditorKitForContentType(java.lang.String type, java.lang.String classname) | Establishes the default bindings of type to name. |
| void removeHyperlinkListener (HyperlinkListener listener) | Removes a hyperlink listener. |
| void setContentType(java.lang.String type) | Sets the type of content that this editor handles. |
| void setEditorKit(EditorKit kit) | Sets the currently installed kit for handling content. |
| void setEditorKitForContentType(java.lang.String type, EditorKit k) | Directly set the editor kit to use for the given type. |
| void setPage(java.net.URL page) | Sets the current url being displayed. |
| void setPage(java.lang.String url) | Sets the current url being displayed. |

Figure 6:
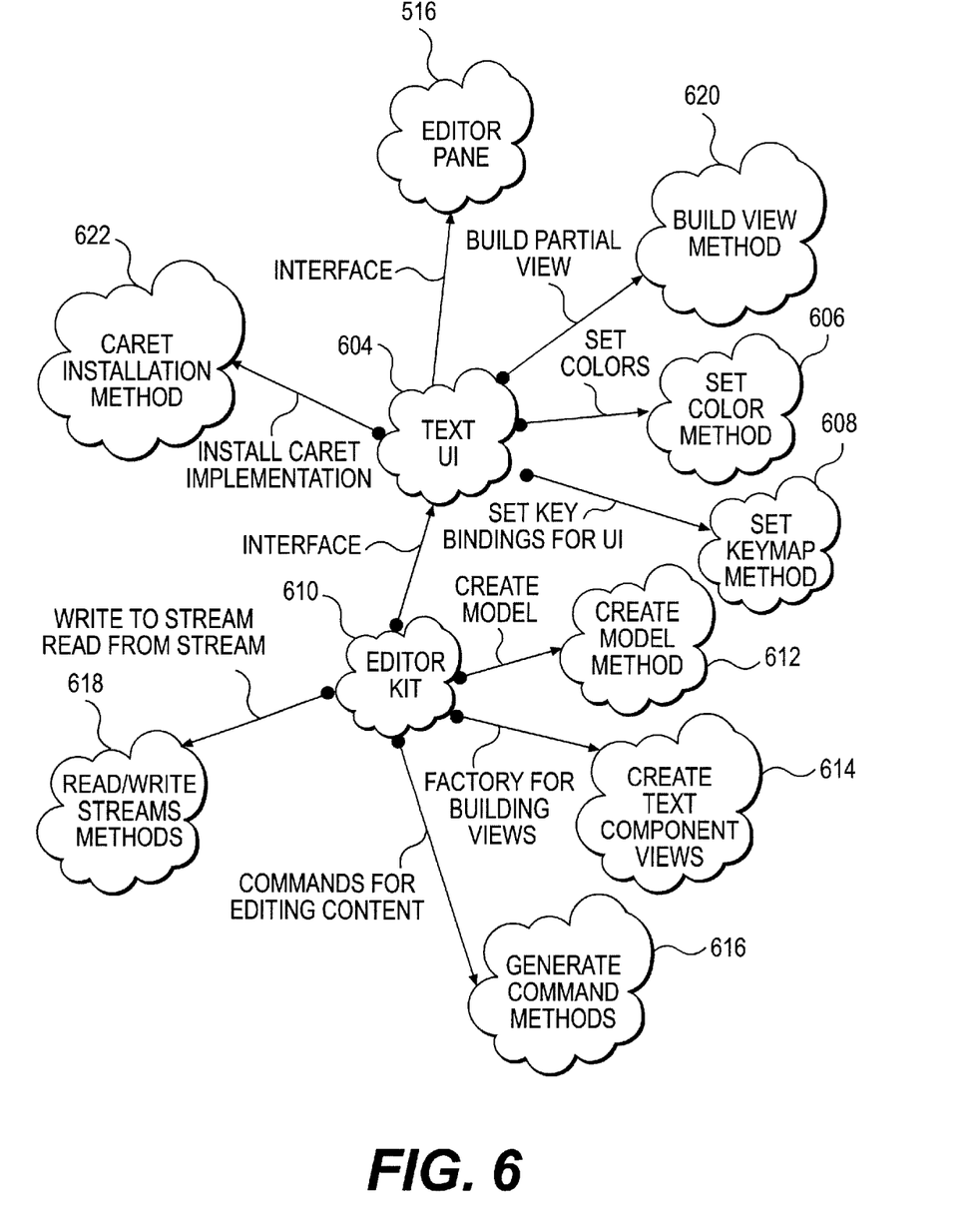
FIG. 6 is another object diagram consistent with one implementation of the present invention.

FIG. 6 is a diagram that illustrates the objects responsible for selecting the user interface and customized editors for a text component. Specifically, user interface characteristics of a text component are delegated to a Text User Interface (UI) 604 and generating a customized editor is delegated to an Editor Kit 610.

Text UI 604 manages the user interface style such as the Windows user interface style, the MacIntosh user interface style, and the Motif user interface style for each instance of Editor Pane 516. Text UI 604 is responsible for setting the user interface properties in Editor Pane 516. For example, Text UI 604 uses a Set Color method 606 to set various colors used in the Text Component object such as the selection of background color and the selection of foreground color. Text UI 604 may also have a Caret Installation method 622 to determine how text is selected in the text component. The caret is used as a placemarker to navigate through text in a text component. Text UI 604 also has a Build View method 620 to determine how the text component is displayed on the screen. Views for displaying the text within Build View Method 620 are delegated to Create Text Component Views 614 associated with an Editor Kit 610.

Further, Text UI 604 may install a keymap for the selected user interface style using Set Keymap method 608. A keymap causes certain functions or applications to execute when keys on a keyboard are pressed. In Java, keymaps are implemented using a Keymap interface so different classes can share key mappings without a superclass/subclass inheritance relationship. Typically, the interface defines the skeleton of the methods and not a detailed implementation of the method. A class that implements an interface guarantees to implement each method in the particular interface. This allows objects to share common methods and code for performing behaviors without inheritance. Specifically, Text UI 604 uses a hash table to map keystrokes to commands. For example, the commands cut, copy, and paste text are mapped in a hash table to the keystrokes <Control>-C, <Control>-X, and <Control>-V, respectively.

Table 2 includes exemplary methods associated with Text UI 604 developed in the Java programming language and consistent with one implementation of the present invention.

TABLE 2

| Text User Interface Methods | Description of Methods |
| --- | --- |
| damageRange(int, int) | Causes the portion of the view responsible for the given part of the model to be repainted. |
| getDefaultMargin( ) | Fetches the default margin space for the text ui. |
| getEditorKit( ) | Fetches the binding of services that set a policy for the type of document being edited. |
| getRootView( ) | Fetches a View with the allocation of the associated text component (ie the root of the hierarchy) that can be traversed to determine how the model is being represented spatially. |
| modelToView(int) | Converts the given location in the model to a place in the view coordinate system. |
| viewToModel(Point) | Converts the given place in the view coordinate system to the nearest representative location in the model. |
| TextUI | public TextUI() |

Features of text component 504 that depend on the text type are delegated to Editor Kit 610. Each instance of Editor Kit 610 customizes and editor to edit the particular type of text. Editor Kit 610 also provides views to generate views for the text editor. For example, Editor Kit 610 provides custom editors for text components having HTML, RTF, and plain text. These custom editors may include details for formatting text as well as selection policies for text, caret implementations, or color schemes.

Different implementations of Editor Kit 610 are registered with an instance of Editor Pane 516 in advance or during execution. Editor pane 516 tracks different types of text and the corresponding Editor Kit 610 implementations in text type registry 517. New Editor Kits can be created by cloning a prototypical Editor Kit 610 with default values and then customizing the editor to fit the particular type of text.

Editor Kit 610 sets text based properties for each instance of Editor Pane 516. For example, Editor Kit 610 determines the type of text and generates a collection of methods represented by Create Model method 612 to process the text. For example, an HTML document may be stored in a hierarchical relationship with a root element at the top the tree and hypertext links to other documents as leaves of the tree. Alternatively, if the document is a plain-text document without hypertext links the text may be stored as a sequence of character elements.

Certain types of text, such as HTML, may also require special editors to display text features such as hypertext. Consequently, Editor Kit provides a factor for building views corresponding to the type of text. Rather than providing a view directly, Editor Kit 610 provides a set of methods represented by Create Text Component Views 614 to create views corresponding to the text type. For example, views for printing text on a printer and views for viewing text on a screen are generally formatted differently. This problem is solved by creating different views of text for display on a screen and printing on a printer. Factories and their applications are discussed in "Design Patterns: Elements of Reusable Object-Oriented Software", by Erich Gamma, Richard Helm, Ralph Johnson, and John Vlissides, Addison-Wesley, Professional Computing Series 1995.

Editor Kit 610 also provides commands tailored to edit the particular text type. Editor Kit 610 processes text associated with a particular text type then generates commands to perform operations on the text stored in the model. These commands are generated by a collection of methods as represented by Generate Commands method 616. For example, these commands may include commands to access text elements in the model including commands to cut, copy, and paste text elements into the model.

Further, Editor Kit 610 can also read and write data to and from a data stream. Because Editor Kit 610 can process text stored in models, Editor Kit 610 can also convert between a stream of text and the text stored in a model. Based on the text type, Editor Kit 610 can parse metadata from a stream of data and arrange the text in the structured format stored in a model.

Table 3 includes an exemplary set of methods associated with Editor Kit 610 developed in the Java programming language and consistent with one implementation of the present invention.

TABLE 3

| Editor Kit Methods | Description of Method |
| --- | --- |
| EditorKit( ) | Editor kit method |
| java.lang.Object clone( ) | Creates a copy of the editor kit. |
| Caret createCaret( ) | Fetches a caret that can navigate through views produced by the associated ViewFactory. |
| Document createDefaultDocument( ) | Creates an uninitialized text storage model that is appropriate for this type of editor. |
| void deinstall(EditorPane c) | Called when the kit is being removed from the EditorPane. |
| Action[ ] getActions( ) | Fetches the set of commands that can be used on a text component that is using a model and view produced by this kit. |
| java.lang.String getContentType( ) | Gets the MIME type of the data that this kit represents support for. |
| ViewFactory getViewFactory( ) | Fetches a factory that is suitable for producing views of any models that are produced by this kit. |
| void install(EditorPane c) | Called when the kit is being installed into the a EditorPane. |
| void read(java.io.InputStream in, Document doc, int pos) | Inserts content from the given stream which is expected to be in a format appropriate for this kind of content handler. |
| void read(java.io.Reader in, Document doc, int pos) | Inserts content from the given stream which is expected to be in a format appropriate for this kind of content handler. |

TABLE 3-continued

| Editor Kit Methods | Description of Method |
|---|---|
| void write(java.io.OutputStream out, Document doc, int pos, int len) | Writes content from a document to the given stream in a format appropriate for this kind of content handler. |
| void write(java.io.Writer out, Document doc, int pos, int len) | Writes content from a document to the given stream in a format appropriate for this kind of content handler. |

Figure 7:
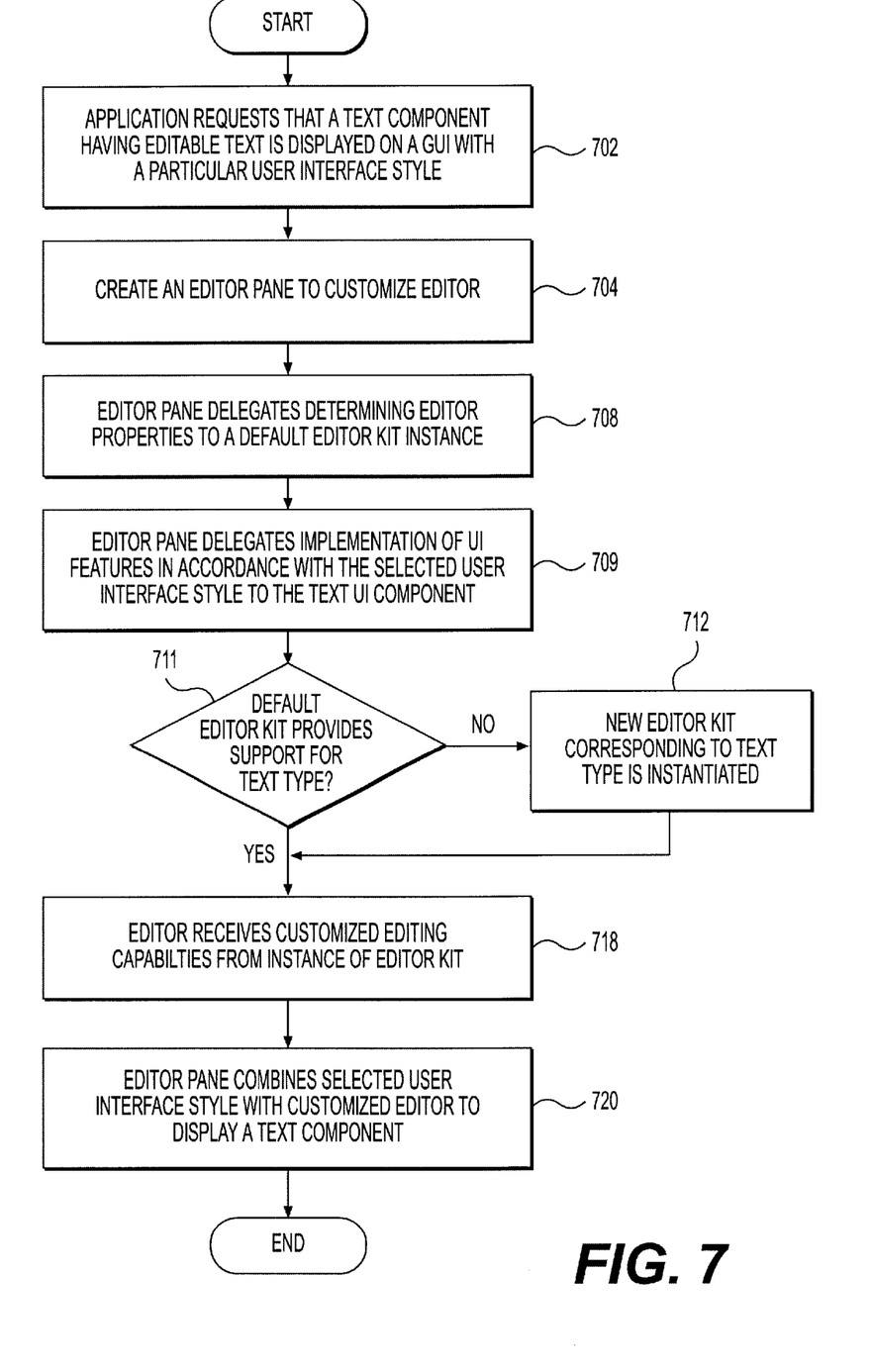
FIG. 7 is a flow chart indicating the method steps used by a GUI application to generate text components in accordance with methods and systems consistent with the present invention.

FIG. 7 is a flow chart of the operations used by a GUI application to generate text components consistent with one implementation of the present invention. Initially, the GUI application requests that a component having editable text is displayed on a GUI with a particular type of user interface style (step 702). For example, the user interface style could be the Windows user interface style, the MacIntosh user interface style, or the Motif user interface style. The GUI application then creates an Editor Pane 516 instance to customize the editor to the type of text and having the selected user interface style (step 704). Editor Pane 516 is a type of text component capable of independently providing customized text editors having a particular user interface.

Editor Pane 516 then delegates implementing editing capabilities to a default Editor Kit 610 (step 708). As previously discussed, Editor Pane 516 tracks text types and corresponding Editor Kit implementations in Text Type Registry 517.

Editor Pane 516 delegates implementation of user interface features to a Text UI object (step 709). Text UI object 604 facilitates generation of views with user interface styles such as the Windows user interface style, the MacIntosh user interface style, and the Motif user interface style.

Editor Pane 516 determines if default Editor Kit 610 is capable of supporting the particular type of text (step 711). If the default Editor Kit does not support the text type, a new editor kit corresponding to the text type is instantiated (step 712). In practice, Text Type Registry 517 may include support for a number of text types including HTML, RTF, and plain text. Text Type registry 517 can be dynamically updated immediately before the text component is generated or can be updated statically by installing an Editor Kit before an application is executed. If Text Type registry 517 is dynamically updated, an application may include a new editor kit or provide the location of such an editor kit upon execution. For example, a new editor kit can be downloaded from a server on the Internet.

The instance of Editor kit 610 is used to customize the editor within Editor Pane 516 (step 718). Editor pane 516 then combines the selected user interface style with the customized editor to display a customized text component in the GUI application (step 720).

While specific implementations have been described herein for purposes of illustration, various modifications may be made without departing from the spirit and scope of the invention. Those skilled in the art understand that the present invention can be implemented in a wide variety of software platforms and is not limited to the Java programming language and development environment. Furthermore, although aspects of the present invention are described as being stored in memory and other storage mediums, one skilled in the art will appreciate that these aspects can also be stored on or read from other types of computer-readable media, such as secondary storage devices, like hard disks, floppy disks, or CD-ROM; a carrier wave from the Internet; or other forms of RAM or ROM. Accordingly, the invention is not limited to the above described embodiments, but instead is defined by the appended claims in light of their full scope of equivalents.

What is claimed is:

1. A method, executed on a computer processor, that generates a text component in an editor, comprising:
   receiving an indication to select a user interface style for the display of the text component;
   delegating implementation of the user interface style within the text component to a text user interface object and implementation of a text editor within the text component to an editor kit object;
   customizing the text editor for the text component with the editor kit object, wherein the editor is customized according to the type of text being edited; and
   displaying the text component and the customized text editor with the selected user interface style.

2. The method in claim 1 wherein customizing the text editor further comprises:
   determining if the editor kit object is capable of customizing the editor according to the text type; and
   creating an a new editor kit object if the editor kit object cannot customize the editor, wherein the new editor kit object is capable of customizing the editor according to the text type.

3. The method of claim 1 wherein the displaying further comprises:
   combining the user interface style with the customized editor using an editor pane object.

4. An apparatus configured to generate a text component in an editor, comprising:
   a processor;
   a memory having instructions executable on the processor that receives an indication to select a user interface style for the display of the text component, delegates an implementation of the user interface style within the text component to a text user interface object and implementation of a text editor within the text component to an editor kit object, customizes the text editor for the text component with the editor kit object, wherein the editor is customized according to the type of text being edited, and displays the text component and the customized text editor with the selected user interface style.

5. The apparatus in claim 4 wherein instructions to generate the text editor further comprise instructions that,
   determine if the editor kit object is capable of customizing the editor according to the text type and create an a new editor kit object if the editor kit object cannot customize the editor, wherein the new editor kit object is capable of customizing the editor according to the text type.

6. The apparatus of claim 4 wherein the instructions to display further comprise instructions that combine the user interface style with the customized editor using an editor pane object.

7. A computer memory containing program code capable of configuring a data processor to generate a text component in an editor, the code having instructions for:
   receiving an indication to select a user interface style for the display of the text component;
   delegating implementation of the user interface style within the text component to a text user interface object and implementation of a text editor within the text component to an editor kit object;

customizing the text editor for the text component with the editor kit object, wherein the editor is customized according to the type of text being edited; and displaying the text component and the customized text editor with the selected user interface style.

8. The computer memory of claim 7 wherein customizing the text editor further comprises code having instructions for:

determining if the editor kit object is capable of generating the editor customized according to the text type; and creating an a new editor kit object if the editor kit object cannot customize the editor, wherein the new editor kit object is capable of customizing an editor according to the text type.

9. The computer memory of claim 7 wherein the displaying further comprises code having instructions for:

combining the user interface style with the customized editor using an editor pane object.

10. An apparatus configured to generate a text component in an editor, comprising:

means for receiving an indication to select a user interface style for the display of the text component;

means for delegating implementation of the user interface style within the text component to a text user interface object and implementation of a text editor within the text component to an editor kit object;

means for customizing the text editor for the text component with the editor kit object, wherein the editor is customized according to the type of text being edited; and means for displaying the text component and the customized text editor with the selected user interface style.

11. A method, executed on a computer processor, that generates a text component used in an editor, comprising:

receiving an indication to select a style from a set of styles to display the text component;

receiving an indication to customize the text component based upon a type of text;

displaying the text component based on the selected style and type of text within the editor; and wherein receiving an indication to customize a text component further comprises delegating implementation of the text component to an editor kit object corresponding to the type of text indicated.

12. The method in claim 11 wherein receiving an indication to select a style further comprises delegating implementation of the user interface style within the text component to a text user interface object.

13. The method in claim 11, wherein delegating implementation of the text component to an editor kit object further comprises:

determining if the editor kit object is capable of customizing the text component according to the text type; and creating an a new editor kit object if the editor kit object cannot customize the text component, wherein the new editor kit object is capable of customizing the text component according to the text type.

14. The method of claim 11 wherein the displaying further comprises:

combining the user interface style with the customized editor using a text pane object.

* * * * *

UNITED STATES PATENT AND TRADEMARK OFFICE
CERTIFICATE OF CORRECTION

PATENT NO. : 6,470,364 B1
DATED : October 22, 2002
INVENTOR(S) : Timothy N. Prinzing It is certified that error appears in the above-identified patent and that said Letters Patent is hereby corrected as shown below:

<u>Title page,</u>
Item [57] ABSTRACT,
Line 5, "GUT" should read -- GUI --;

<u>Column 12,</u>
Lines 23 and 50, before "a new" delete "an";

<u>Column 13,</u>
Line 12, before "a new" delete "an";

<u>Column 14,</u>
Line 19, after "claim 11" delete the comma; and
Line 25, before "a new" delete "an".

Signed and Sealed this

Twenty-fifth Day of February, 2003

JAMES E. ROGAN
*Director of the United States Patent and Trademark Office*